Aug. 26, 1941.   H. F. BAKEWELL   2,253,493
MACHINE TOOL
Filed Sept. 4, 1940   3 Sheets-Sheet 2
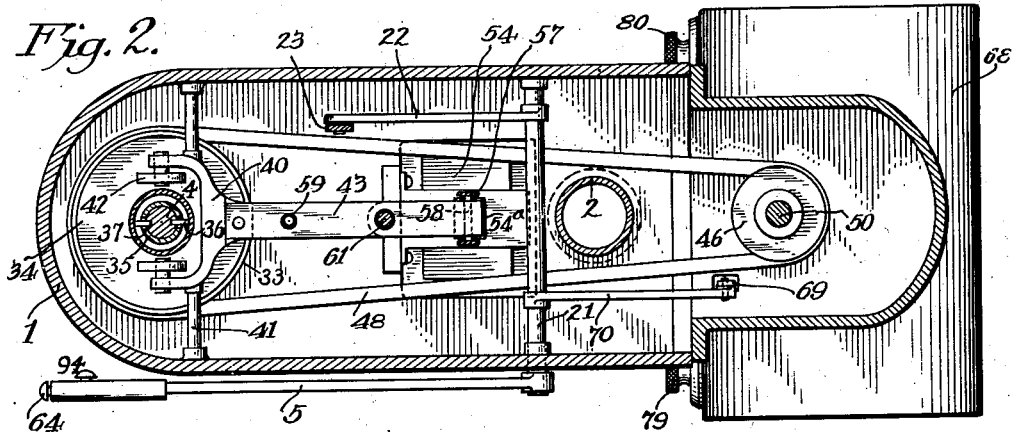
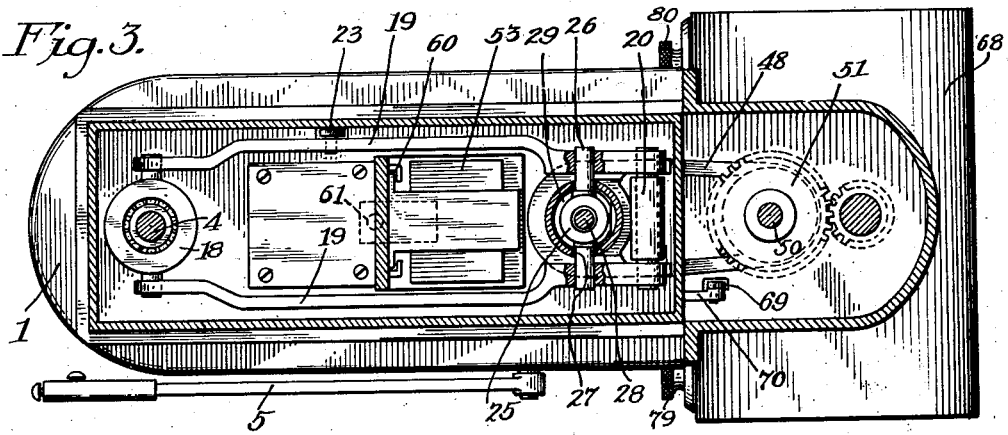
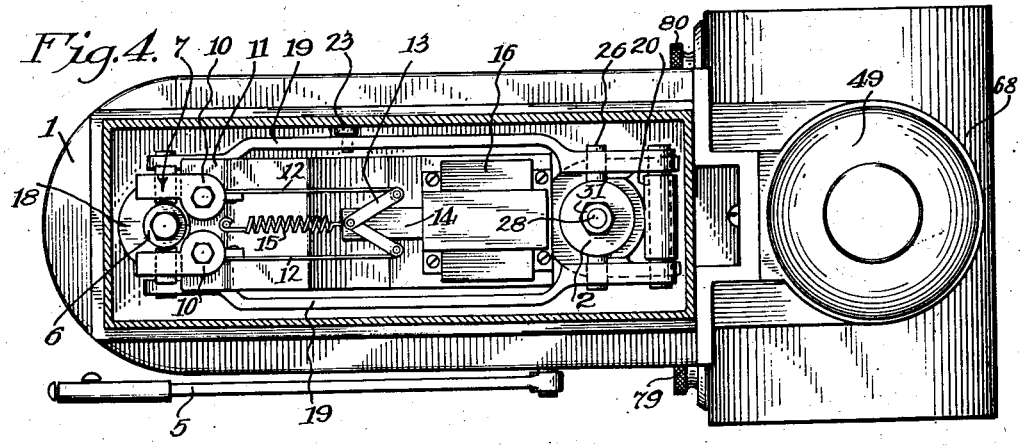
INVENTOR.
Harding F. Bakewell,
BY R. W. Smith Aug. 26, 1941.  H. F. BAKEWELL  2,253,493

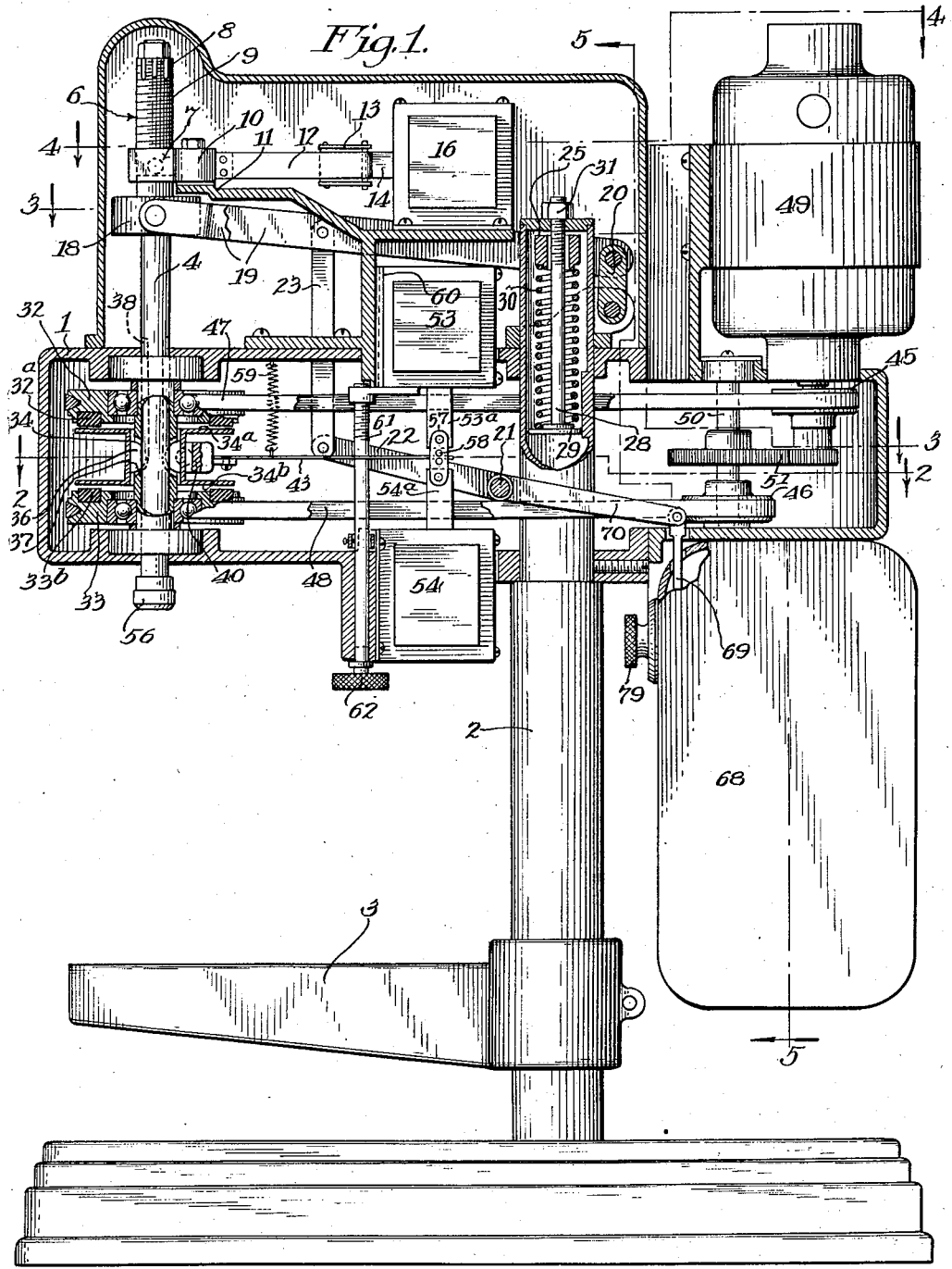

MACHINE TOOL

Filed Sept. 4, 1940  3 Sheets-Sheet 3

INVENTOR.
*Harding F. Bakewell,*
BY R. L. Smith

Patented Aug. 26, 1941

2,253,493

UNITED STATES PATENT OFFICE 2,253,493

MACHINE TOOL

Harding F. Bakewell, San Marino, Calif.

Application September 4, 1940, Serial No. 355,279

6 Claims. (Cl. 10—135)

This invention is a machine tool of the type functioning by relative rotary and axial movement of a tool element and the work, e. g. a tapping machine; and has for an object to insure precision relative movement of the tool element and the work and automatic discontinuance of said relative movement at predetermined torque capacity of the machine.

More particularly, it is an object of the invention to relatively axially feed the tool element and the work by interfitting and relatively rotatable threaded guides, and to discontinue relative rotation of the threaded guides at predetermined torque capacity of the machine.

It is a further object of the invention to relatively rotate a tool element and the work by a clutch engagement; and to actuate the clutch by shiftable means which is tensioned by its clutch-engaging shifting, for tensioning clutch engagement; and which is adapted for clutch-disengaging shifting responsive to torque resistance of the relatively rotating tool element and work exceeding tension of the clutch engagement.

It is a further object of the invention to selectively relatively rotate the tool element and the work by one or the other of driving means, and to rotate the driving means in opposite directions from a common source of rotary power which is adapted for rotation in one direction, there being driving connections between the source of rotary power and the respective driving means for oppositely rotating the latter, preferably at different speeds. When the tool element and the work are relatively rotated by one of the driving means the tool element is thus adapted for operative engagement with the work, and when the tool element and the work are relatively rotated by the oppositely rotating driving means the tool element is adapted for withdrawal from the work.

It is a still further object of the invention to release the selectively engaged driving means at predetermined torque capacity of the machine.

It is a still further object of the invention to adjust the releasing point for that driving means which relatively rotates the tool element and the work in direction for operative engagement, so as to adjust the torque capacity at which operation of the machine will be arrested.

It is a still further object of the invention to release that driving means which relatively rotates the tool element and the work in direction for operative engagement, when the tool element has been fed a predetermined distance relative to the work, and to then engage the other driving means for relatively rotating the tool element and the work in direction for withdrawal of the tool element from the work.

Further objects of the invention will be readily understood from the following description of the accompanying drawings which illustrate a form which the invention may assume in practice, it being understood that the form which is shown and described is for purpose of illustration, and that the invention may be modified and is entitled to various forms without departing from the scope of the appended claims.

In the drawings:

Fig. 1 is a side elevation of the invention, partly in axial section.

Figs. 2, 3 and 4 are transverse sections on the lines 2—2, 3—3 and 4—4 respectively of Fig. 1.

Figure 5:
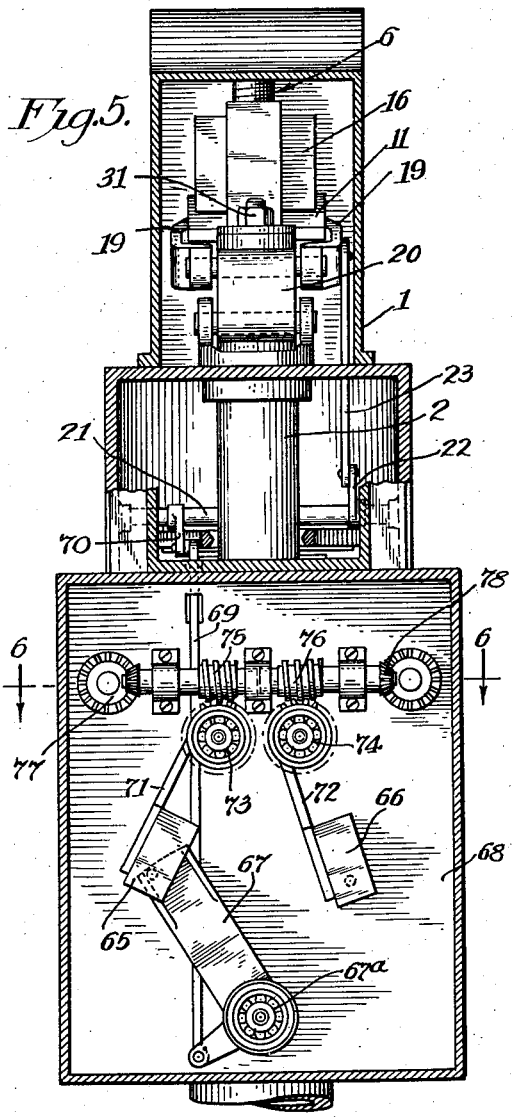
Fig. 5 is a vertical section on the line 5—5 of Fig. 1.

The invention is particularly applicable and is therefore described in connection with a machine tool in which a tool element is rotated and fed axially relative to stationary work, for threading the work either internally or externally, e. g. a tapping machine.

As an instance, a spindle frame 1 is mounted on a column 2, and a work table 3 is vertically adjustable on the column. A tool spindle 4 is rotatable in the frame 1; and is also axially movable relative to the frame and the work table, either manually by a lever 5 or by relative rotation of inter-fitting threaded guides 6—7.

The cooperating threaded guides 6—7 are preferably of the type disclosed and claimed in my copending application Ser. No. 297,697, filed October 3, 1939; i. e. the guide 6 is a threaded sleeve which is fixed on the spindle 4 for rotation and axial movement therewith, and the guide 7 is threaded for engagement with the threaded sleeve 6 and is mounted in the spindle frame 1 so that it is held against rotary and axial movement relative to the sleeve. The threaded sleeve 6 is rotated and axially displaced with the spindle 4, for first cutting a cooperating thread in the guide 7, and thereafter makes threaded engagement with the thread which has been cut in the guide 7, for axially feeding the rotating spindle 4 in accordance with the lead defined by the thread of the sleeve 6.

As an instance, the threaded sleeve 6 includes a hob 8 for cutting threads in the guide 7, and a pilot 9 which has a thread corresponding to the threads which have been cut in the guide 7. The guide 7 preferably comprises a pair of blocks which engage the sleeve 6 at diametrically opposite points and which are supported by arms 10 which are pivotally mounted on a bracket 11 in the spindle frame 1. The arms 10 are swung relative to the bracket 11 by spring levers 12, which are connected via links 13 to an actuating rod 14.

A spring 15 tends to project the rod 14 so as to swing the levers 12 to a position in which the blocks 7 are clear of the sleeve 6 as shown at Fig. 4; and the rod 14 is adapted for retraction against the tension of the spring 15 for swinging the levers 12 to position engaging the blocks 7 with the sleeve 6, with the spring tension of the levers urging the blocks into snug threaded engagement with the sleeve. The rod 14 is adapted for retraction by energizing an electrical solenoid 16 which is mounted in the spindle frame 1.

A collar 18 is mounted on the spindle 4 for rotation of the spindle relative to the collar and axial displacement of the spindle with the collar; and a pair of levers 19 are pivoted to the collar 18, with the opposite ends of the levers pivoted in the spindle frame 1 at a link connection 20. The levers 19 are thus adapted for swinging movement responsive to axial feed of the spindle 4 by relative rotation of the cooperating threaded guides 6—7. The levers 19 are also adapted for swinging movement for axially displacing the spindle 4, by manually swinging the lever 5. For this purpose, the lever 5 is fixed to a transverse shaft 21 which is journaled in the spindle frame 1, and a lever 22 is fixed to the shaft 21 and is connected by a link 23 to one of the levers 19.

Axial displacement of the spindle 4 is counterbalanced. For this purpose, the levers 19 straddle the upper end of the column 2; and a collar 25 is slidable in the upper end of the column 2 and is connected by pivot pins 26 to the levers 19, the pivot pins extending through vertical slots 27 in the wall of the column 2. A rod 28 projects longitudinally into the column 2 through the collar 25, and has a collar 29 fixed against rotation on its inner end, with a spring 30 between the collars 25—29.

The rod 28 and the collar 29 are adapted for axial displacement but are fixed against rotation in the column 2; and the tension of the spring 30 is adjusted by rotating a nut 31 which is threaded on the upper end of the rod 28. The tension of the spring 30 is adjusted for counterbalancing the spindle 4, preferably so that the spindle just tends to shift upwardly in the spindle frame 1.

The spindle 4 is selectively rotated in opposite directions by pulleys 32—33 which are journaled on the spindle in the frame 1, there being a clutch 34 between the pulleys, fixed for rotation with the spindle and adapted for axial shifting for frictionally engaging one or the other of the pulleys 32—33. As an instance, a sleeve 35 is journaled in the frame 1 and is mounted on the spindle 4 for axial displacement of the spindle relative to this sleeve; and the pulleys 32—33 are journaled on and fixed against axial displacement relative to the sleeve 35. The clutch 34 is mounted on the sleeve 35 between the pulleys, and has friction faces 34a—34b adapted to selectively engage cooperating friction faces 32a—33b of the pulleys 32—33.

The clutch is fixed against rotation relative to the spindle 4, by keys 36 which project through slots 37 in the sleeve 35, into cooperating slots 38 in the spindle. The slots 37 are of a length permitting axial movement of the clutch relative to the sleeve 35 for selectively engaging the cooperating friction faces 32a—34a or the cooperating friction faces 33b—34b. The slots 38 are of a length permitting desired axial displacement of the spindle 4 relative to the spindle frame and the work table, while maintaining engagement between the keys 36 and the slots 38.

The clutch 34 is actuated by an operating lever which intermediate its ends is pivoted in the spindle frame 1 as shown at 41, with a yoke 40 at one end of the lever operatively engaging the clutch, and with the other end of the lever comprising an arm 43 which is adapted to be swung for shifting the yoke so as to axially shift the clutch to operatively engage it with one or the other of the pulleys 32—33.

The pulleys 32—33 are driven by pulleys 45—46 via belts 47—48; and the pulleys 45—46 are driven in opposite directions from a common source of rotary power which rotates in one direction. As an instance, an electric motor 49 is mounted at the rear of the spindle frame 1, and the pulley 45 is fixed on the shaft of the motor, while the pulley 46 is fixed on a countershaft 50 which is driven by the motor shaft via speed reduction and reversing gearing 51.

The arm 43 of the operating lever is swung in opposite directions by selectively energizing electrical solenoids 53—54, for shifting the yoke 40 for selectively engaging the clutch 34 with one or the other of the pulleys 33—32.

When the arm 43 is actuated by energizing the solenoid 53, the yoke 40 is shifted so that the clutch 34 engages the pulley 33, thereby rotating the spindle 4 via speed reduction gearing 51, in direction for operatively engaging a tool element of the spindle with the work on the table 3. This tool element may be a tap (not shown), mounted in a chuck 56 at the lower end of the spindle 4. When the arm 43 is swung in the opposite direction by energizing the solenoid 54, the yoke 40 is shifted so that the clutch 34 engages the pulley 32, thereby rotating the spindle 4 in the opposite direction and at higher speed than when the spindle is rotated by the pulley 33, for reversely rotating the tool element relative to the work.

As an instance, the solenoids 53—54 are mounted in the spindle frame 1 with their cores 53a—54a projecting toward one another and connected by a pair of links 57; and the end of the arm 43 is straddled by the links 57 and is mounted between transverse pins 58 which connect the pair of links. The weight of the cores of the solenoids is counterbalanced, preferably by a spring 59, so that when the solenoids 53—54 are deenergized the arm 43 assumes neutral position as shown at Fig. 1, thereby shifting the yoke 40 so that the clutch 34 is disengaged from both of the pulleys 32—33.

The operating lever is arranged so that when its arm 43 has been swung for operatively shifting the yoke 40, said shifting of the yoke is spring tensioned so as to tension the frictional engagement of the clutch 34 with one or the other of the pulleys 32—33, and while the arm 43 remains swung to its operative position the spring tensioned yoke 40 is adapted to yield for releasing the frictional engagement of the clutch at predetermined torque capacity of the machine, for releasing the rotary driving connection for the spindle 4.

As an instance, the arm 43 of the operating lever is a leaf-spring, whereby initial swinging of the arm by the energized solenoid 53 or 54 shifts the yoke 40 so as to frictionally engage the clutch, and after the clutch has been engaged continued swinging of the spring arm by the energized solenoid flexes the spring arm so that it tensions engagement of the clutch. With the spring arm then retained in its swung position by the energized solenoid, it remains flexed and tensioned for maintaining tension at the clutch engagement; and while thus retained in its swung position the tension of the flexed spring arm is adapted to yield and thus permit shifting of the yoke for releasing the clutch engagement, responsive to predetermined excessive torque at the frictioned clutch engagement.

Means are provided for adjusting the tension of the spring arm 43 when it has been actuated by energizing the solenoid 53, i. e. when it has been actuated for frictionally engaging the faces 33b—34b so as to rotate the spindle 4 in direction for operative engagement of the tool element with the work. The frictional engagement at 33b—34b may thus be adjusted by varying the tension of the spring arm 43, for yielding of this frictional engagement and release of the driving connection via pulley 33, at desired torque capacity of the machine.

For this purpose, the solenoid 53 is adjustable longitudinally of its core 53a, for adjusting swinging and flexing of the spring arm 43 by the energized solenoid, and thus adjusting the tension exerted by the flexed arm. As an instance, the solenoid 53 is slidable in a vertical guideway 60 in the spindle frame 1, and is vertically adjusted by a screw 61 which has a control knob 62 at the exterior of the spindle frame.

When the machine is not in operation, the parts are in the position shown at Fig. 1; i. e. the motor 49 is at rest, the solenoids 53—54 are deenergized so that the clutch 34 is in neutral position, and the solenoid 16 is deenergized so that the guide blocks 7 are swung clear of the cooperating threaded guide 6.

An electrical control is preferably provided whereby the cycle of operation is as follows: A master switch 63 is closed, thereby starting the motor 49 and oppositely rotating the pulleys 32—33. A control switch 64 is then actuated, thereby energizing the solenoid 16 and thus engaging the threaded guides 6—7, and also energizing the solenoid 53 and thus engaging the clutch 34 with the pulley 33 for rotating the spindle 4 in direction for operative engagement of the tool element with the work. The rotating spindle 4 is thus fed axially by the threaded engagement 6—7 for operatively engaging the tool element with the work, e. g. tapping the work.

When the spindle 4 has been axially fed the desired distance, e. g. when the work has been tapped to the desired depth, the solenoid 53 is deenergized and the solenoid 54 is energized, thereby engaging the clutch 34 with the pulley 32 for reversely rotating the spindle 4 so that the threaded engagement 6—7 reversely feeds the spindle 4 for retraction of the tool element from the work. When the tool element is clear of the work, the solenoid 54 is deenergized, whereby the clutch 34 returns to neutral position for arresting rotation of the spindle 4; and the solenoid 16 is deenergized so that the threaded guide blocks 7 are swung clear of the cooperating threaded guide 6. The parts are thus again in the position shown at Fig. 1, ready for repeating the cycle of operation by again actuating the control switch 64.

Figure 6:
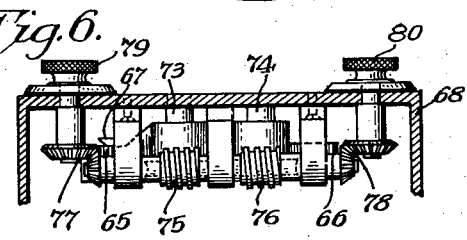
Fig. 6 is a transverse section on the line 6—6 of Fig. 5.

As shown in Figs. 5 and 6, the electrical control includes normally open electrical switches 65—66 which are respectively closed when engaged by an arm 67, the switches and their cooperating arm being preferably housed in a casing 68 which depends from the rear of the spindle frame 1. The arm 67 is pivotally mounted at 67a and is swung in opposite directions by a link 69. The link 69 is connected to a lever 70 which is fixed to and projects rearwardly from the transverse shaft 21, within the spindle frame 1. The arm 67 is thus swung in one direction (Fig. 5) when the spindle 4 is axially retracted from the table 3; and the arm 67 is swung in the opposite direction when the spindle 4 is axially projected toward the work table.

The switches 65—66 are mounted on arms 71—72 which are pivotally adjustable at 73—74. As shown at Fig. 5, the arm 71 is pivotally adjusted so that the arm 67 engages and closes the switch 65 at predetermined limit of upward travel of the spindle 4, and the arm 72 is pivotally adjusted so that the arm 67 engages and closes the switch 66 at predetermined limit of downward travel of the spindle. The arms 71—72 may be pivotally adjusted by worm-gear connections 75—76, which are respectively actuated via driving connections 77—78, by control knobs 79—80 at the exterior of the casing 68.

Figure 7:
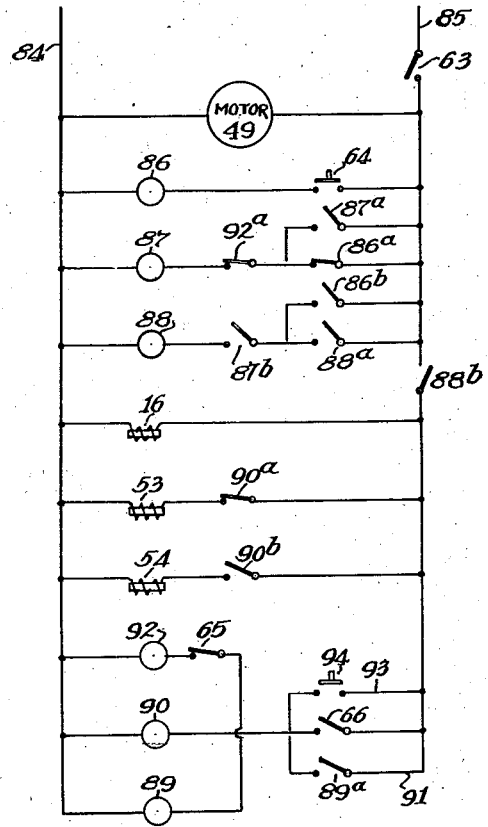
Fig. 7 is a wiring diagram.

The electrical circuit may be arranged as shown at Fig. 7.

Electrical energy is supplied via leads 84—85 and thence via the master switch 63 which is closed when the machine is to be operated, thereby energizing the motor 49. The control switch 64 is normally open and controls a relay 86 which when deenergized closes a switch 86a and opens a switch 86b. With the control switch 64 in normal open position, closing the master switch 63 energizes a pilot relay 87 via the closed switch 86a and via a normally closed switch 92a; and when the pilot relay 87 is thus energized it closes normally open switches 87a—87b.

The spindle 4 being at its upper limit of travel, with the switch 66 in normal open position and the arm 67 engaging and closing the switch 65, the cycle of operation is started by closing the control switch 64. This energizes the relay 86, thereby opening the switch 86a and closing the switch 86b. Opening the switch 86a does not break the circuit for the pilot relay 87, since the closed switch 87a now maintains this circuit; and closing the switch 86b energizes a relay 88 via the closed switch 87b. Energizing the relay 88 closes the normally open switches 88a—88b. The control switch 64 may then be released for spring retraction to normal position (thereby deenergizing the relay 86 and returning the switches 86a—86b to normal closed and open positions respectively), since the closed switch 88a now maintains the circuit for the relay 88. The switch 88b thus remains closed, for continuing the cycle of operation to completion.

The closed switch 88b energizes the solenoid 16 for operatively engaging the cooperating threaded guides 6—7; and the closed switch 88b also energizes the solenoid 53 via a normally closed switch 90a, while the circuit for the solenoid 54 remains interrupted at a normally open switch 90b. The clutch 34 is thus actuated for driving the spindle 4 via the pulley 33, i. e. for rotating the spindle and axially feeding it by the cooperating threaded guides 6—7, for tapping engagement of the tool element with the work. This axial feed of the spindle 4 swings the arm 67 so as to disengage it from the switch 65; and this switch, as well as the switch 66, are thus in normal open position during downward feed of the spindle 4.

At predetermined limit of downward feed of the spindle, as determined by adjustment of the arm 72, the arm 67 engages and closes the switch 66. Closing the switch 66 energizes relays 89—90. Energizing the relay 89 closes a switch 89a in a holding circuit 91 for the relays 89—90; and energizing the relay 90 opens the normally closed switch 90a and closes the normally open switch 90b. The solenoid 53 is thus deenergized and the solenoid 54 is energized, thereby reversing rotation and axial feed of the spindle 4 for threaded retraction of the tool element from the tapped work. This retraction of the spindle 4 swings the arm 67 so as to disengage it from the switch 66, and this switch, as well as the switch 65, are thus in normal open position during retraction of the spindle. However the closed switch 89a continues to energize the relays 89—90 via the holding circuit 91, and the switch 90b thus remains closed for energizing the solenoid 54 so as to continue retraction of the spindle 4.

At predetermined limit of retraction of the spindle, as determined by adjustment of the arm 71, the arm 67 engages and closes the switch 65. Closing the switch 65 energizes a relay 92 via the closed holding circuit 91; and energizing the relay 92 opens the normally closed switch 92a. The relay 87 is thus deenergized, thereby opening the switches 87a—87b; and the open switch 87b deenergizes the relay 88, thereby opening the switches 88a—88b.

Opening the switch 88b deenergizes the solenoids 16 and 54, with the solenoid 53 remaining deenergized, and also deenergizes the relays 89—90—92. Deenergizing the solenoid 16 disengages the cooperating threaded guides 6—7; and deenergizing the solenoid 54 returns the clutch 34 to neutral position, disengaged from both the pulleys 32—33. Deenergizing the relay 89 opens the switch 89a; and deenergizing the relay 90 returns the switches 90a—90b to normal closed and open position respectively. Deenergizing the relay 92 returns the switch 92a to normal closed position. The parts are thus again in the position first described, with the motor 49 still running and with the electrical control ready for repeating the cycle of operation when the control switch 64 is again closed.

If desired, an emergency circuit 93 may be provided, with a normally open switch 94 in this circuit. At any point during downward travel of the spindle 4, the switch 94 may be closed at the will of the operator. This energizes the relays 89—90, thereby closing the switch 89a and opening the normally closed switch 90a and closing the normally open switch 90b as previously described, for deenergizing the solenoid 53 and energizing the solenoid 54 so as to reverse the rotation and axial feed of the spindle 4 for withdrawal of the tool element from the work. When the spindle has reached predetermined limit of withdrawal, with the emergency switch 94 having been released for spring retraction to normal open position, the arm 67 engages and closes the switch 65, thereby completing the cycle of operation as previously described.

To prepare the machine for operation, the sleeve 6 which is mounted on the spindle 4 has a hob 8 and a pilot thread 9 corresponding to the desired tapping operation by the tool element which is mounted in the chuck 56; and blocks 7 with no threads cut therein are mounted in the arms 10. The spindle 4 is axially shifted by the lever 5 so that the lower end of the hob 8 is alined with the blocks 7; and operation of the machine is started by closing the switches 63—64. The blocks 7 are thus engaged by the hob 8 and the spindle 4 is rotated. The hob 8 thus starts a corresponding thread in the blocks 7, and as soon as this thread has been started the pitch of the hob provides the lead for downwardly feeding the rotating spindle 4 so as to complete the thread in the blocks 7.

The machine is then stopped by opening the master switch 63. The spindle 4 is then axially shifted by the lever 5 and the arms 71—72 are pivotally adjusted by their control knobs 79—80, so that during the cycle of operation and throughout the range of axial displacement of the spindle 4 the threaded blocks 7 will be transversely alined with the pilot thread 9. The electrical control is then actuated as previously described, thereby engaging the threaded blocks 7 by the interfitting pilot thread 9 and rotating the spindle 4 by the pulley 33. The rotating spindle 4 is thus fed downwardly by the interfitting and relatively rotating threaded guides 6—7, so that the tool element which is mounted in the chuck 56 will correspondingly tap the work on the table 3. When the work has been tapped to the desired depth as determined by the adjustment of the arm 72, rotation of the spindle 4 is reversed as previously described, and the interfitting and relatively rotating threaded guides 6—7 thus withdraw the spindle, for threaded retraction of the tool element from the tapped work.

By adjusting the spring 30, the spindle 4 is counterbalanced so as to relieve the interfitting threaded guides 6—7 of axial strain, thereby adapting the spindle for precision feed by the interfitting and relatively rotating threaded guides; and by vertically adjusting the solenoid 53 relative to its core 53a, the frictional engagement at 32a—34a is adjustably tensioned so that during the tapping operation this frictional engagement will yield at predetermined torque capacity of the machine, thereby arresting rotation of the spindle 4 and thus arresting tapping feed of the tool element, due to relative rotation of the interfitting threaded guides 6—7 having been arrested.

For convenience in operating the electrical control, the switch 64 is preferably mounted on the handle of the lever 5; and the emergency switch 94 is preferably also mounted on this handle. The master switch 63 may be mounted on the machine at any place (not shown) where it is accessible for starting or stopping the cycle of operation.

I claim:

1. In a machine tool; a rotatable spindle; a rotary driving means; a clutch between the spindle and the driving means; a lever having a yoke shiftable for engaging or disengaging the clutch, an arm having an actuating end shiftable to operative position, and a spring connection adapting the yoke and the actuating end of the arm for relative movement for tensioning the spring connection responsive to shifting the actuating end of the arm to operative position; the tensioned spring connection shifting the yoke for engaging the clutch and adapted to yield responsive to torque resistance of the spindle exceeding tension of the spring connection, for clutch-disengaging shifting of the yoke while the actuating end of the arm is retained in operative position; and operating means for shifting and retaining the actuating end of the arm in operative position.

2. In a machine tool; a rotatable spindle; a rotary driving means; a clutch between the spindle and the driving means; a lever having a yoke shiftable for engaging or disengaging the clutch and a leaf-spring arm for shifting the yoke and having an actuating end shiftable to operative position; the leaf-spring arm being adapted for flexing for tensioning the arm and shifting the yoke for engaging the clutch responsive to shifting the actuating end of the arm to operative position; the flexed and tensioned leaf-spring arm being adapted to yield responsive to torque resistance of the spindle exceeding tension of the arm, for clutch-disengaging shifting of the yoke while the actuating end of the arm is retained in operative position; and operating means for shifting and retaining the actuating end of the arm in operative position.

3. In a machine tool; a rotatable spindle; a rotary driving means; a clutch between the spindle and the driving means; a lever having a yoke shiftable for engaging or disengaging the clutch, an arm having an actuating end shiftable to operative position, and a spring connection adapting the yoke and the actuating end of the arm for relative movement for tensioning the spring connection responsive to shifting the actuation end of the arm to operative position; the tensioned spring connection shifting the yoke for engaging the clutch and adapted to yield responsive to torque resistance of the spindle exceeding tension of the spring connection, for clutch-disengaging shifting of the yoke while the actuating end of the arm is retained in operative position; operative means for shifting and retaining the actuating end of the arm in operative position; and means for adjusting the clutch-engaging tension exerted by the tensioned spring connection.

4. In a machine tool; a rotatable spindle; a rotary driving means; a clutch between the spindle and the driving means; a lever having a yoke shiftable for engaging or disengaging the clutch and a leaf-spring arm for shifting the yoke and having an actuating end shiftable to operative position; the leaf-spring arm being adapted for flexing for tensioning the arm and shifting the yoke for engaging the clutch responsive to shifting the actuating end of the arm to operative position; the flexed and tensioned leaf-spring arm being adapted to yield responsive to torque resistance of the spindle exceeding tension of the arm, for clutch-disengaging shifting of the yoke while the actuating end of the arm is retained in operative position; operating means for shifting and retaining the actuating end of the arm in operative position; and means for adjusting the operating means so as to vary the flexing of the leaf-spring arm for adjusting the clutch-engaging tension exerted by the flexed arm.

5. In a machine tool; a rotatable spindle; a rotary driving means; a clutch between the spindle and the driving means; a lever having a yoke shiftable for engaging or disengaging the clutch, an arm having an actuating end shiftable to operative or inoperative position, and a spring connection adapting the yoke and the actuating end of the arm for relative movement for tensioning the spring connection responsive to shifting the actuating end of the arm to operative position; the tensioned spring connection shifting the yoke for engaging the clutch and adapted to yield responsive to torque resistance of the spindle exceeding tension of the spring connection, for clutch-disengaging shifting of the yoke while the actuating end of the arm is retained in operative position, and the tensioned spring connection being adapted for relief of its tension and shifting of the yoke for disengaging the clutch, responsive to shifting the actuating end of the arm to its inoperative position; and operating means for selectively shifting and retaining the actuating end of the arm in operative or inoperative position.

6. In a machine tool; a rotatable spindle; driving means rotating in opposite directions; a clutch between the spindle and the driving means; a lever having a yoke shiftable for selectively engaging the clutch with the respective driving means or disengaging the clutch from both driving means; an arm having an actuating end selectively shiftable to operative positions or to an inoperative position, and a spring connection adapting the yoke and the actuating end of the arm for relative movement for tensioning the spring connection responsive to shifting the actuating end of the arm to either operative position; the tensioned spring connection shifting the yoke for selectively engaging the clutch in accordance with the selected operative position of the actuating end of the arm, and adapted to yield responsive to torque resistance of the spindle exceeding tension of the spring connection, for clutch-disengaging shifting of the yoke while the actuating end of the arm is retained in selected operative position, and the tensioned spring connection being adapted for relief of its tension and shifting of the yoke for disengaging the clutch, responsive to shifting the actuating end of the arm to its inoperative position; and operating means for selectively shifting and retaining the actuating end of the arm in inoperative or in either operative position.

HARDING F. BAKEWELL.